U S006645418B2

(12) United States Patent (10) Patent No.: US 6,645,418 B2
Kitahara et al. (45) Date of Patent: Nov. 11, 2003

(54) METHOD OF PRODUCING A POROUS RESIN STAMP

(75) Inventors: Shigeru Kitahara, Osaka (JP); Yasuo Nagasawa, Osaka (JP); Yuji Tanaka, Sakai (JP); Yoshitomo Tanaka, Sakai (JP)

(73) Assignee: Sunlux Corporation, Osaka (JP)

( * ) Notice: Subject to any disclaimer, the term of this patent is extended or adjusted under 35 U.S.C. 154(b) by 0 days.

(21) Appl. No.: 09/764,980

(22) Filed: Jan. 16, 2001

(65) Prior Publication Data

US 2002/0066980 A1 Jun. 6, 2002

(30) Foreign Application Priority Data

Dec. 5, 2000 (JP) .......................................... 2000-370269

(51) Int. Cl.[7] .............................................. B29C 67/20
(52) U.S. Cl. .......................... 264/413; 264/48; 264/321
(58) Field of Search ................................. 101/327, 335; 428/195, 304.4; 264/48, 413, 321

(56) References Cited

U.S. PATENT DOCUMENTS 5,620,777 A * 4/1997 Goto et al. ................. 428/158
6,010,767 A * 1/2000 Ando ......................... 428/195
6,075,070 A * 6/2000 Lin et al. .................... 523/161

* cited by examiner

Primary Examiner—Allan R. Kuhns
(74) Attorney, Agent, or Firm—Curtis L. Harrington

(57) ABSTRACT

The present invention aims to provide a porous resin stamp, which can repeatedly seal without supplying ink for a long period of time by beforehand soaking ink therein, and a producing method thereof. The present invention is characterized in the producing method of porous resin stamp, wherein an original that can selectively pass light through is put together with a porous resin body combined with at least phathalocyanine pigments as heating material which generate heat by light irradiated from a light source; the light is irradiated from the original side toward the surface of porous resin body; and an ink inexuding portion is formed by melting a surface layer of the porous resin body with heat of the heating material generated by the light passed through the original.

2 Claims, 3 Drawing Sheets (a)

(b)

METHOD OF PRODUCING A POROUS RESIN STAMP

BACKGROUND OF THE INVENTION

1. Field of the Invention

The present invention relates to a producing method of porous resin stamp, and its object is to provide a porous resin stamp, which can repeatedly seal without supplying ink for a long period of time by beforehand soaking ink therein, and a producing method thereof.

2. Description of the Related Art

There is a porous resin stamp known as a stamp, which can repeatedly seal without supplying ink each time by beforehand soaking ink to the stamp. The porous resin stamp is comprised of porous resin having open cells through which ink is supplied onto a stamp surface, thus, it is possible to repeatedly seal.

As for a method for producing such porous resin stamp, a stamp manufacturing processing by a thermal head, a stamp manufacturing processing by a flashing light, a thermal transfer method and such are known. This stamp manufacturing processing by a flashing light is an art to irradiate light such as infrared light toward a surface of a porous resin body so that heating material is made to be negatives, i.e., inantiomers to desired letters, designs, patterns and such by generating heat, and to form ink inexuding portion and ink exuding portion by melting a surface layer of the porous resin body.

As a concrete example of the stamp manufacturing processing by a flashing light, a porous resin stamp wherein open cells are filled by melting a surface of the porous resin body by making black pigment to generate heat with irradiating light on the surface of the porous resin body, which is layered with a layer beforehand combined with predetermined amount of black pigment or with a layer of which surface comprised of black pigment, is disclosed in a publication of Japan patent application tokuganhei 9-314972.

However, the above mentioned existing porous resin stamp has the following problems. The porous resin stamp disclosed in the publication of Japan patent application Tokuganhei 9-314972 was inferior in reproducibility, particularly of thin lines and spots, because this porous resin stamp only comprised black pigment as heating material, of which heat conductivity was high, and thus, irradiated part and the surrounding porous resin body became melted when melting the porous resin body with generated heat of heating material by irradiating light.

Also, in a case of porous resign stamp soaked only in black pigment, the porous resin stamp became one color, black. For example, in a case of soaking the stamp in black ink which is used most frequently, it became difficult to discern the ink and the desired letters, designs, patterns and such formed on the stamp surface, and consequently, it was difficult to distinguish the top and bottom and the right and left of the stamp surface. Further, it was difficult to find stain adhered, thus, it was inconvenient to use.

Moreover, since the porous resin body and an original being directly porous in contact were irradiated wish light when producing the porous resin stamp, there might be some cases where the melted porous resin body and the heating material beforehand combined with the porous resin body became adhered to the original. Therefore, the problem was that the original itself could not be re-used directly when producing the same stamp.

BRIEF SUMMARY OF THE INVENTION

The present invention is to solve the above mentioned problems of the prior arts. The invention relates to a producing method of porous resin stamp, wherein an original that can selectively pass light through is put together with a porous resin body combined with at least phathalocyanine pigment as heating material which generated heat by light irradiated from a light source; the light is irradiated from the original side toward the surface of porous resin body; and an ink inexuding portion is formed by melting a surface layer of the porous resin body with heat of the heating material generated by the light passed through the original.

The invention also relates to a producing method of porous resin stamp, wherein an original that can selectively pass light through is put together with a porous resin body which all surface or a part thereof is layered with at least phathalocyanine pigment as heating material which generated heat by light irradiated from a light source; the light is irradiated from the original side toward the surface of porous resin body; and an ink inexuding portion is formed by melting a surface layer of the porous resin body with heat of the heating material generated by the light passed through the original.

The invention also relates to a producing method of porous resin stamp wherein a light transmittable film is present between said porous resin body and said original.

The invention also relates to a producing method of porous resin stamp wherein carbonic particles are comprised in said heating material.

The invention also releases to a producing method of porous resin stamp wherein composition rate of said carbonic particles and said phathalocyanine pigment is weight ratio 0.1:1.0-5.0:1.0.

The invention also relates to a porous resin stamp comprised of porous resin body which part of surface layer is melted to form ink inexuding portion, and is characterized in that at least phathalocyanine pigment is combined in said porous resin body.

The invention also relates to a porous resin stamp comprised of porous resin body which part of surface layer is melted to form ink inexuding portion, and is characterized in that at least phathalocyanine pigment is combined in all surface or a part of stamp surface.

Figure 6:
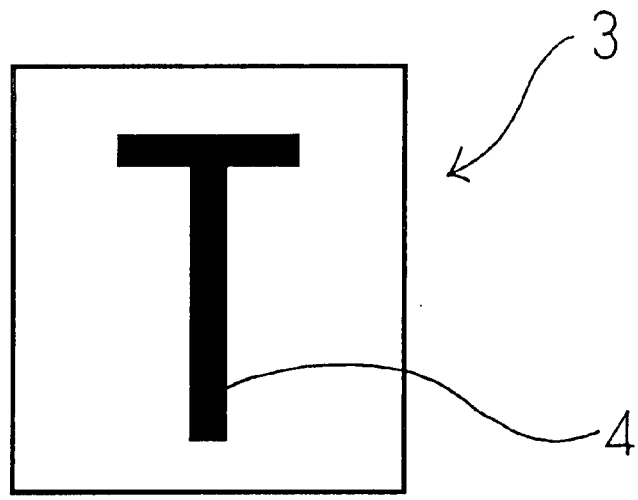
Figure 6:
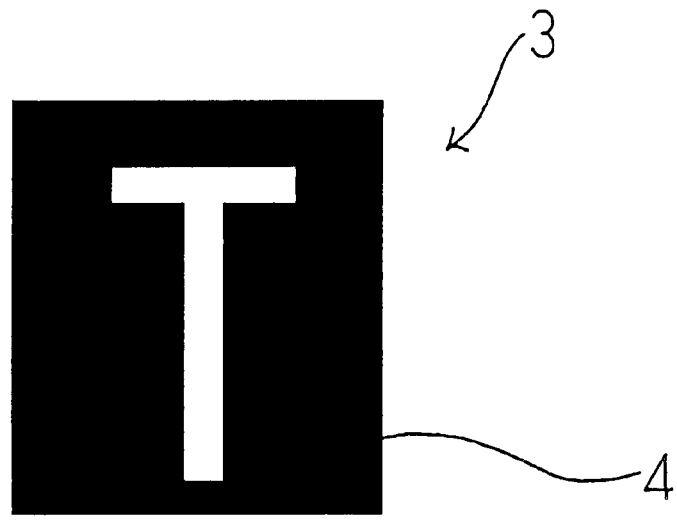

Both (a) and (b) of FIG. 6 are plan views showing one of the preferred embodiments of an original.

DESCRIPTION OF PREFERRED EMBODIMENTS OF THE INVENTION

Figure 1:
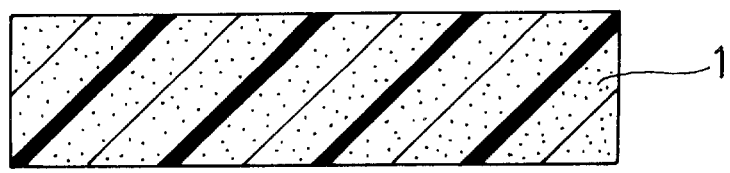
FIG. 1 is a sectional view of a porous resin body combined with a heating material.
Figure 2:
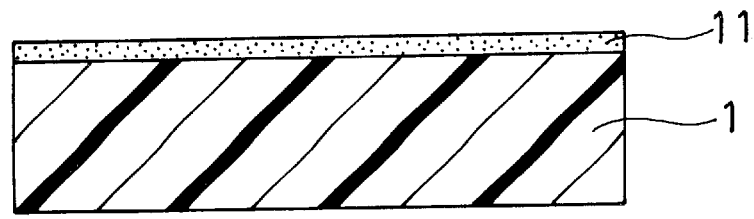
FIG. 2 is a sectional view of a porous resin body combined with a heating material.
Figure 3:
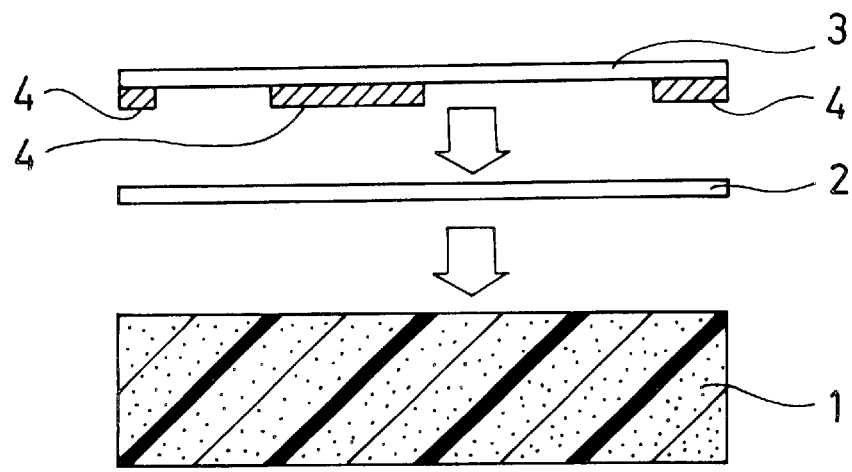
FIG. 3 is a schematic description diagram showing a condition of porous resin stamp combined with heating material and an original, which are layered and put together via a light transmittable film.
Figure 4:
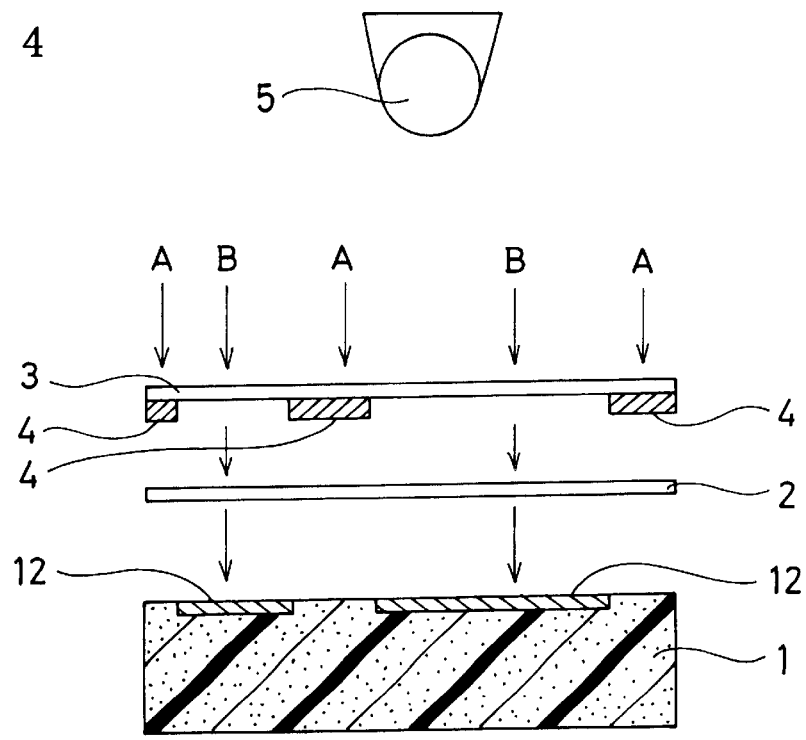
FIG. 4 is a schematic description diagram of a producing method of a porous resin stamp in a case of using a porous resin body shown in FIG. 1.
Figure 5:
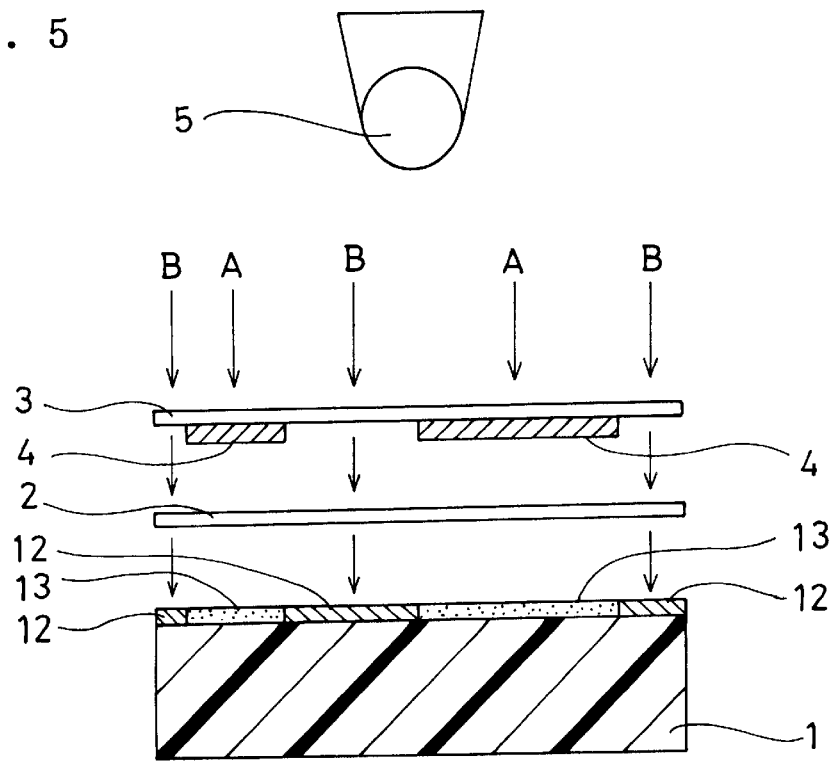
FIG. 5 is a schematic description diagram of a producing method of a porous resin stamp in a case of using a porous resin body shown in FIG. 2.

The producing method of porous resin stamp set forth in the present invention will be explained hereinafter with references made to the drawings. FIG. 1 is a sectional view of a porous resin body combined with a heating material, and FIG. 2 is a sectional view of a porous resin body combined with a heating material. FIG. 3 is a schematic description diagram showing a condition of porous resin stamp combined with heating material and an original, which are layered and put together via a light transmittable film. FIG. 4 is a schematic description diagram of a producing method of a porous resin stamp in a case of using a porous resin body shown in FIG. 1. FIG. 5 is a schematic description diagram of a producing method of a porous resin stamp in a case of using a porous resin body shown in FIG. 2. (a) and (b) of FIG. 6 are plan views showing, one of the preferred embodiments of an original.

The producing method of porous resin stamp set forth in the present invention is characterized in that light is selectively irradiated to a surface of porous resin body combined with a particular heating material or to a surface of porous resin body which surface is layered with a particular heating material in order to melt the surface layer of said porous resin body and to form ink exuding portion and ink inexuding portion.

To produce the porous resin stamp set forth in the present invention, firstly, a porous resin body (1) combined with heating material shown in FIG. 1 or a porous resin body (1) layered with heating material on a part or all of the front surface as shown in FIG. 2 is prepared.

As for the porous resin body (1) used, there is no particular limitation as long as it can be melted with generated heat of the below mentioned heating material and is an open cell structure having ink-resistance. Concretley speaking, polyolefinic resin such as polyethylene, polyamide, polyurethane, polyacetal, polystyrene and polypropylene, or thermoplastic resin such as ethylenevinylalcohol (EVA) can be exemplified.

The percentage of voids of porous resin body (1) used is not particularly restricted, however, it is 40–80%, more preferably 50–70%. Also, the diameter of cell of open cell is not particularly restricted, however, it is below 50 $\mu$m, more preferably 5–30 $\mu$m.

The density of porous resin body (1) used is not particularly restricted, however, it is 0.2–0.6 g/cm$_3$, preferably 0.3–0.5 g/cm$^3$. Also, the melting point thereof is not particularly restricted, however, it is 60–120° C., preferably 70–110° C.

Further, a method for forming the open cell structure in the porous resin body (1) is not particularly restricted, for example, a forming method wherein an agent to form pores, such as calcium carbonate, magnesium carbonate, polyhydric alcohol, salt, sugar, starch, hemicellulose and tetramethylmethane, monomers of polyhydric alcohol such as polyalkylene glycol and diethylene glycol, or an accelerator of the agent to form pores, such as polymers, are kneaded in material of porous resin, and after forming by adding additives at need, such as plasticizer like dioctyl pthalate, dioctyl adipate and Vulkanol 88 (Tradename; Bayer, a German company), the agent to form pores is dissolved and removed with solvent that can be dissolved in water, such as water, low aliphatic alcohol, dilute acidic water and dilute alkalic water. Additionally, porous resin body (1) with open cell structure formed by other methods can be suitably used.

As for the heating material, phathalocyanine pigments such as copper phathalocyanine blue B and copper phathalocyanine green are used, and it is more preferable to combine carbonic particles such as carbon black in addition to the phathalocyanine pigments.

The reason for using the phathalocyanine pigments is that it is outstanding in reproducibility of small letters, designs, patterns and dots, compared with a case for using blackish heating material such as carbonic particles, for example. Also with the heating material, different colors appear at a heated part and non-heated part, so it is possible to readily check the result of stamp by comparing the ink inexuding parts formed on the stamp surface and the desired letters, designs, patterns and such. Further, when producing stamps, it is possible to easily check the progression of how much the ink inexuding parts are formed.

Moreover, the reason for preferably using a mixture of the carbonic particles and the phathalocyanine pigments is that it is possible to easily obtain a heating effect suitable for each of the cases wherein the desired letters, designs and patterns are minute or rough, by adjusting a combination rate thereof. In other words, when it is rough, the combination amount of carbonic particles are increased to obtain a high heating effect, and when it is minute, the combination amount of carbonic particles are lowered to made it heat gently. Further, by varying the combination amount of phathalocyanine pigments to change the color of heating material, it is possible to distinguish the color of ink spread out from the ink exuding parts and the color of ink inexuding parts. For example, by making it green with pigments of carbon and phathalocyanine blue, it is easy to distinguish with blackish and reddish inks. Additionally, when making dark brown by adjusting the combination, it is possible to easily distinguish with inks of black, purple, blue, red and such.

When using the carbonic particles and the phathalocyanine pigments combined together, the combination rate is not particularly restricted, however, it is weight ratio 0.1:1.0–0.1:5.0, more preferably, 0.5:1.0–3.0:1.0. Further, particle diameter of the carbonic particles and the phathalocyanine pigments are not particularly restricted, however, it is below 20 $\mu$m, more preferably, 5–10 $\mu$m.

Apart from the above, heating material which can generate enough heat to melt said porous resin body (1) by being irradiated light from the light source (5) can also be suitably and optionally combined. Concretely speaking, metal oxides, metals, nitroso compound, cyanine coloring matter, thiol nickel complex, napthoquine pigment, anthraquine pigment and such can be exemplified, and one of or a mixture of more than two of these can be used.

The particle diameter of said heating material is not particularly restricted, however, it is below 20 $\mu$m, more preferably, 5–10 $\mu$m.

A method for preparing the porous resin body (1), which is combined with the heating material shown in FIG. 1, is not particularly restricted. For example, a method wherein the porous resin body (1) is formed after dispersing resin material being beforehand combined with the heating material, can be exemplified. In this case, the amount of the heating material to be combined is not particularly restricted, however, it is 0.2 weight %–15 weight % to the porous resin body, more preferably, 0.4 weight %–10 weight %.

Additionally, the method for forming the porous resin body is not particularly restricted, and compression molding, extrusion molding, injection molding and such can be exemplified.

Also, a method for preparing the porous resin body (1) of which front surface is layered with the heating material shown in FIG. 2 is not particularly restricted, and a method for applying the heating material by diluting with solvent such as alcohol can be exemplified. The thickness of a layer of heating material layered on the surface of the porous resin body (1) is not particularly restricted, but it is over 50 μm.

Next, as shown in FIG. 3, the porous resin body (1) combined with the heating material and an original (3) are put together via a light transmittable film (2). Or, the porous resin body (1) of which front surface is layered with the heating material and an original (3) are put together via a light transmittable film (2).

The original (3) is constructed so that it can selectively pass the irradiated light. In a case of the illustrated example, the original (3) is comprised of a light transmittable material of which surface comprises positive drawings of the desired letters, designs, patterns and such drawn with a light non-transmittable material (4). For example, if a porous resin stamp for sealing a letter "T" is to be produced, the original (3) wherein a letter "T" is drawn with the light non-transmittable material (4), as shown in FIG. 6, should be prepared. Also, if a porous resin stamp for sealing a letter "T" in void is to be produced, the original (3) wherein a letter "T" is drawn in void with the light non-transmittable material (4), as shown in FIG. 6, should be prepared. Then, as shown in FIG. 3, the original (3) is put together with the light transmittable film (2) so that the surface of the original (3), wherein the desired letters, designs, patterns and such are drawn, contacts thereto.

It is also possible to draw inantiomers of the desired letters, designs, patterns and such on the surface of the original (3) with the light non-transmittable material (4). In this case, the original (3) is put together with the light transmittable film (2) so that the opposite surface to the surface of original (3), wherein the inantiomers of the desired letters, designs, patterns and such are drawn, contacts thereto. Additionally, in this case, it is possible to put the opposite surface to the surface of original (3), wherein the inantiomers of the desired letters, designs, patterns and such are drawn, against the porous resin body (1) to contact thereto without inserting the light transmittable film (2).

The light non-transmittable material (4) used is not particularly restricted, and carbon toner and such can be exemplified. Also, a method for drawing the desired letters, designs, patterns and such on the surface of original (3), and methods such as printing by a thermal printer, printing with a silver ribbon and drawing with a felt pen can be exemplified.

The original (3) is comprised of material that can transmit light, such as plastic film, plastic sheet and silver salt film, which can be obtained from polyethylene, polypropylene, polyester, polyvinyl chloride, polyvinylidence chloride and such, can be exemplified, however, it is not particularly restricted.

The thickness of the original (3) is not also particularly restricted, however, it is 10–100 μm, more preferably 10–80 μm.

The cases for using the light transmittable original (3) to which the desired letters, designs, patterns and such are drawn with the light non-transmittable material (4) have been described heretofore, however, the original (3) is not particularly restricted, as long as it can selectively pass light through. For example, it is possible to use original (3) which is cut out in shapes of the desired letters, designs, patterns and such and the inantiomers thereof from light non-transmittable sheets, thick papers and so forth.

The light transmittable film (2) being present in between the original (3) and the porous resin body (1) is used so that the porous resin body (1) and the original (3) can be easily taken off after irradiating with light. As for such light transmittable film (2), it is not particularly restricted, as long as it transmit light, for example, plastic film, plastic sheet and silver salt film, which can be obtained from polyethylene, polypropylene, polyester, polyvinyl chloride, polyvinylidence chloride and such.

The thickness of the light transmittable film (2) is not also particularly restricted, however, it is 10–100 μm, more preferably 10–50 μm.

Next, as illustrated in FIG. 4 and FIG. 5, light is irradiated from light source (5) on the side of original (3) toward the surface of the porous resin body (1). As for such light source (5) used, it is not particularly restricted, as long as it can melt the surface layer of the porous resin body (1) by making the heating material to generate heat, for example, flash lamp, strobe lamp and such can irradiate light such as infrared light.

The strength of the light is not also particularly restricted, as long as it is strong enough to make the heating material to generate heat sufficiently.

Additionally, due to the convenience for describing, there are some spaces between the porous resin body (1) and the light transmittable film (2), and the light transmittable film (2) and the original (3) in FIG. 4 and FIG. 5, however, in a case of irradiating light in reality, these are closely adhered.

Among the irradiated light reached from the side of the original (3) onto the surface of the original (3), the light reaches the drawing parts of the desired letters, designs, patterns and such (A in the figure) cannot pass through the original (3). On the other hand, the light reaching the non drawing parts of the desired letters, designs, patterns and such (B in the figure) not only pass through the original (3) but reach onto the porous resin body (1) through the light transmittable film (2). The light that can reach onto the surface of the porous resin body (1) is the light passed through the original (3) to which the desired letters, designs, patterns and such (or the inantiomers thereof) are drawn with the light non-transmissible material (4).

In other words, as shown in FIG. 4, if the porous resin body (1), which is combined with the heating material, is used, the light reached onto the surface of the porous resin body (1) makes the heating material being layered on the surface of the porous resin body (1) to generate heat, so that the surface layer portion of the porous resin body (1) gets melted to form ink inexuding portion (12). On the surface layer of the porous resin body (1), the parts excepting the part at where the ink inexuding portion (12) is formed become ink exuding portion (13).

This is how a porous resin stamp comprising the ink exuding portion (13) formed to be the inantiomers of the desired letters, designs, patterns and such, and the ink inexuding portion (12) formed to be not only the inantiomers but negatives of the desired letters, designs, patterns and such, on the stamp surface, is produced.

As described heretofore, since the method for producing the porous resin stamp set forth in the present invention uses at least phathalocyanine pigments as a heating material, it is possible to intentionally adjust efficiency rate of heat generation of the heating material by suitably changing the amount of heating material combined to a porous resin body or the mixing rate of heating material. This makes it possible to express any small letters, minute designs and patterns with high reproducibility. Also, by inserting a light transmittable film between the porous resin body and an original, it is possible not only to easily peel off the porous resin body and the original, but also to prevent melted porous resin and the heating material from directly adhering onto the original, thus, the original can be readily re-used.

Furthermore, since the porous resin stamp set forth in the present invention uses the phathalocyanine pigments as a heating material, it is possible to intentionally adjust colors by adjusting the amount of heating material combined or the mixing rate of heating material, thus, it is possible to precisely check the desired letters, designs, patterns and such on the stamp surface. Therefore, it becomes easy to distinguish stamps and to check the top and bottom, the right and left of a stamp surface.

What is claimed is:

1. A process for producing a porous resin stamp comprising the steps of:

in a porous resin body having a heating material volumetrically combined within said porous resin body, said heating material including at least phathalocyanine pigment, selectively melting a first portion of an exterior surface of the porous resin body by light irradiation, to form an ink inexuding melted portion as the first portion of the exterior portion of said porous body;

selectively maintaining a second portion of the exterior surface of the porous resin body for assisting in flow of ink through to the exterior of said porous body by selectively blocking the irradiation of light toward said second portion of an exterior surface of the porous resin body to restrain heating of said body having said heating material.

2. A process for producing a porous resin stamp comprising the steps of:

in a porous resin body, layering a porous heating material having at least a phathalocyanine pigment on a first surface of said porous resin body;

selectively melting a first portion of said layered porous heating material by exposure to irradiated light, to form an ink inexuding melted portion;

selectively maintaining a second portion of the layered porous heating material for assisting in flow of ink through to the exterior of said porous body by selectively blocking the irradiation of light toward said second portion of said layered porous heating material to restrain heating of said layered porous heating material.

* * * * *